United States Patent [19]

Shimizu et al.

[11] Patent Number: 5,119,301
[45] Date of Patent: Jun. 2, 1992

[54] VEHICLE LOCATION DETECTING SYSTEM

[75] Inventors: Osamu Shimizu; Kenji Tenmoku; Yoichi Doi; Kunihiko Mito, all of Osaka, Japan

[73] Assignee: Sumitomo Electric Industries, Ltd., Osaka, Japan

[21] Appl. No.: 508,666

[22] Filed: Apr. 13, 1990

[30] Foreign Application Priority Data

Apr. 17, 1989 [JP] Japan .................................. 1-96741

[51] Int. Cl.⁵ ............................................ G06F 15/50
[52] U.S. Cl. .................................... 364/450; 364/449; 340/995
[58] Field of Search ........................ 364/449, 457, 450; 340/990, 995

[56] References Cited

U.S. PATENT DOCUMENTS

| | | | |
|---|---|---|---|
| 4,796,189 | 1/1989 | Nakayama et al. | 364/449 |
| 4,796,191 | 1/1989 | Honey et al. | 364/450 |
| 4,879,658 | 11/1989 | Takashima et al. | 364/449 |
| 4,903,212 | 2/1990 | Yokouchi et al. | 364/449 |
| 4,954,959 | 9/1990 | Moroto et al. | 364/449 |
| 4,964,052 | 10/1990 | Ohe | 364/449 |
| 4,970,652 | 11/1990 | Nagashima | 364/449 |

Primary Examiner—Thomas G. Black

[57] ABSTRACT

A vehicle location detecting system comprising:
a heading sensor for detecting changes in the heading of a vehicle as it moves over streets;
a distance sensor for detecting distances traveled by the vehicle;
a road map memory for storing a map data base;
location detecting unit for detecting a first estimated location of the vehicle; and
correction arithmetic unit for calculating a second estimated location of the vehicle from the distances detected by the distance sensor and the changes in the heading detected by the heading sensor, for detecting an optimum vehicle location of the vehicle by calculating a degree of similarity between the second estimated location and the map data base obtained from road map memory, for calculating a first probability area of the first estimated location including an actual location of the vehicle and a second probability area of the optimum vehicle location including an actual location of the vehicle, and for correcting the second estimated location with the aid of the first estimated location in accordance with the degree of similarity, first probability area and second probability area.

6 Claims, 6 Drawing Sheets

VEHICLE LOCATION DETECTING SYSTEM

FIELD OF THE INVENTION

The present invention relates in general to a vehicle location detecting system, and in particular to a vehicle location detecting system wherein the location of a vehicle is estimated with the aid of distance and heading sensors, and wherein pattern matching between the estimated location and the road network data obtained from a road map memory is performed, and wherein the vehicle location is detected in accordance with a degree of similarity (S) of the vehicle on each road (rate of coincidence between the path pattern taken by the vehicle and the map pattern) and in accordance with a probability area ($\sigma$) having a certain probability of including the actual location of the vehicle.

DESCRIPTION OF THE PRIOR ART

A variety of automatic vehicle navigational systems has been developed and used to provide information about the actual location of a vehicle as it moves over streets. For example, one general approach to such navigational systems is known as "dead reckoning", in which the vehicle is tracked by advancing a "dead reckoned position" from measured distances and courses or headings. A system based upon dead reckoning principles may, for example, detect the distance traveled and heading of the vehicle using distance and heading sensors on the vehicle.

One problem with prior systems using dead reckoning is the accumulation of error that occurs as the dead reckoned positions are advanced. This error occurs, in part, as a result of inherent limitations on the achievable accuracy of the distance and heading sensors. Unless compensation for this error is made, the dead reckoned positions will become increasingly imprecise or inaccurate.

In order to solve the accumulation of error, there has been proposed a road matching method wherein the accumulated error is eliminated by matching the travel track obtained by heading and distance sensors with the road pattern obtained from road network data.

However, if in the road matching method the road network data are inaccurate and the road network is a complicated shape or in the form of a lattice, it becomes difficult that errors in the vehicle location obtained by read reckoning are compensated by the road pattern obtained from road network data. For this reason, once the vehicle location is inaccurately detected, it is sometimes impossible to reset the inaccurate vehicle location to an accurate vehicle location. In addition, there are some cases where a probability of inaccurately detecting a road on which the vehicle travels actually is increased.

Although the accuracy of the road network data can be improved, the time and effort required is greatly increased.

Thus, the reliability of the above described road matching method is not satisfactory, and is required to be improved.

Accordingly, it is a main object of the present invention to provide an improved vehicle location detecting system which can continue a stable road matching for a long period of time, without deteriorating the accuracy of detection of a vehicle location.

SUMMARY OF THE INVENTION

In accordance with an important aspect of the present invention, there is provided a vehicle location detecting system comprising:

a heading sensor (3) for detecting changes in the heading of a vehicle as it moves over streets;

a distance sensor (4) for detecting distances traveled by the vehicle;

a road map memory (5) for storing a map data base;

location detecting unit (7) for detecting a first estimated location ($P_G$) of the vehicle; and correction arithmetic unit (8) for calculating a second estimated location of the vehicle from the distances detected by the distance sensor (4) and the changes in the heading detected by the heading sensor (3), for detecting an optimum vehicle location ($P_M$) of the vehicle by calculating a degree of similarity (S) between the second estimated location and the map data base obtained from road map memory (5), for calculating a first probability area ($\sigma_G$) of the first estimated location ($P_G$) including an actual location of the vehicle and a second probability area ($\sigma_M$) of the optimum vehicle location ($P_M$) including an actual location of the vehicle, and for correcting the second estimated location with the aid of the first estimated location ($P_G$) in accordance with the degree of similarity, first probability area ($\sigma_G$) and second probability area ($\sigma_M$).

According to the present invention, when the optimum vehicle location cannot be calculated by the road matching process, the estimated location obtained from the satellites is automatically employed. That is, the optimum estimated location obtained by the current estimating means is replaced with the estimated location obtained by the GSP receiver. When, on the other hand, the optimum vehicle location can be accurately calculated by the road matching process, the optimum vehicle location by the road matching process is automatically employed. That is, the optimum vehicle location obtained by the road matching is outputted as a current location of the vehicle without being corrected. In addition, if the accuracy of the vehicle location calculated by the road matching process is not favorable, then either the estimated location $P_G$ or optimum vehicle location is employed taking account of the accuracy of the road matching and the received state from the satellites.

Therefore, by suitably selecting information about vehicle locations obtained by the road matching and GPS receiver, a most probable vehicle location at this time can be obtained. This corrected vehicle location is fed back to the current location estimating means to initialize the road matching process and thus minimize the location error. Consequently, the probability of the road matching is greatly increased.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 1:
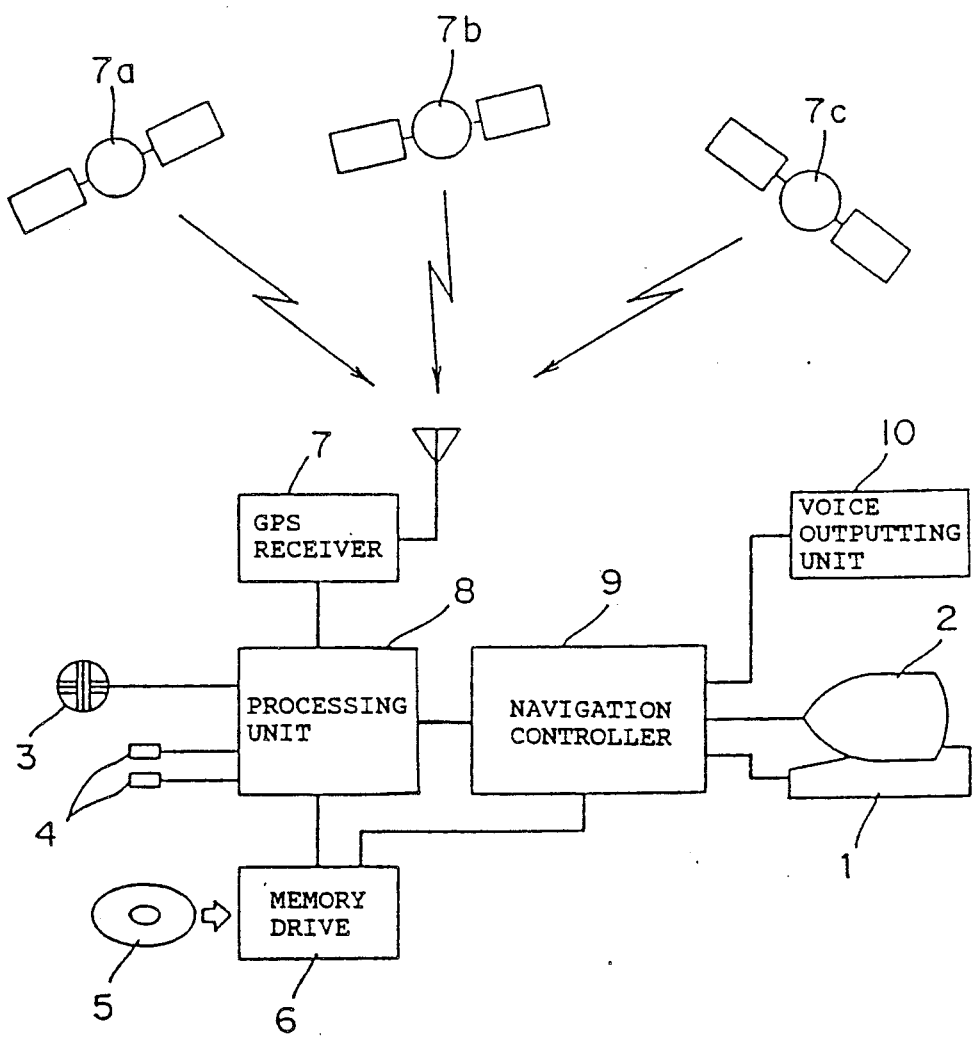
FIG. 1 is a block diagram showing the structure of a vehicle location detecting system according to one embodiment of the present invention.

Referring now in greater detail to the drawings and initially to FIG. 1, there is shown a preferred embodiment of a vehicle location detecting system in accordance with the present invention. The vehicle location detecting system comprises a console 1, a display 2, a heading sensor 3, a distance sensor 4, a road map memory 5 for storing a map data base, road network data base and similar data base, a memory drive 6 for reading data from the road map memory 5, a GPS (Global Positioning System) receiver 7 for receiving radio waves from satellites 7a, 7b and 7c in order to detect the location of the receiver 7 itself (that is, vehicle location), and a voice outputting unit 10.

The vehicle location detecting system further comprises a processing unit 8 provided with correction arithmetic means for evaluating a degree of similarity S and a probability area $\sigma$ of including the actual location of a vehicle. The degree of similarity S and probability area $\sigma$ will hereinafter be described in detail. Depending upon the evaluation, the processing unit 8 corrects the vehicle location with the aid of an estimated location $P_G$ of the vehicle detected by the GPS receiver 7.

The vehicle location detecting system further comprises a navigation controller 9 for executing computation of recommended routes, retrieving and reading of a road map in a predetermined range, generation of display data to guide a vehicle operator, driving of the display 2 and voice outputting unit 10, and various arithmetic controls such as controls of the processing unit 8.

The above described console 1 has a keyboard (not shown) which allows a vehicle operator to start and stop this vehicle location detecting system, and to move a cursor on the picture screen of the display 2 and to scroll the road map displayed on the picture screen.

The road map memory 5 comprises a mass storage medium memory such as a CD-ROM, magnetic tape and like. In the road map memory 5, the road map is divided into mesh blocks, and there are stored a map data base used for graphically displaying roads and coordinate location at the unit of each mesh block, and a road network data base used for route computation and road matching. The road network data base comprises data of roads (segments) that are interconnected by junctions (nodes) having inlet/outlet ports, distance data of segments, required time data to travel segments, road class data (freeways, major arteries, minor arteries, streets, etc.), road width data, and point data to specify specific points such as famous facilities, rivers, railways, street names and the like. The map data base comprises a plurality of road maps which are different in contraction scale.

The display 2 has a transparent touch panel attached on the picture screen such a CRT (cathode Ray Tube) and a crystalline panel, and displays an initial setting menu supplied from the navigation controller 9. The vehicle operator touches the displayed positions of the picture screen of the display 2 to enter the set reference of a recommended route (for example, a minimum time route, shortest distance route, route having a small number of left turns and right turns, and wide route), magnification of map, destination and so on. That is, the navigation controller 9 interacts through the display 2 with the vehicle operator The destination can also be entered with the keyboard of the console 1 or by selecting it from the point data containing place names, famous facilities, and points that has been stored by a vehicle operator. In addition, points on the way to the destination can be entered by the vehicle operator.

The heading sensor 3 detects changes in the heading of the vehicle as it moves over streets, and comprises a magnetic sensor, gyro or turning-angle sensor which detects a turning angle from a difference of rotation between the left and right wheels of the vehicle.

The distance sensor 4 is used for detecting distances traveled by a vehicle. For example, the distance sensor 4 can constitute a vehicle speed sensor which senses the speed of a vehicle, or one or more wheel sensors which sense the rotation of the wheels of a vehicle.

The navigation controller 9 obtains information about vehicle locations from the processing unit 8, and displays on the map the current location and destination of the vehicle. The navigation controller 9 is constituted by a microcomputer (not shown), a graphic data processor (not shown) and a picture image processing memory (not shown), and executes display of menus, retrieval of maps, switching of contraction scale, zoom scroll, display of the current location and heading of a vehicle, display of an destination or guide spots, and display of the heading and distance to an destination.

The GPS receiver 7 measures the wave arrival time from each satellite by decoding false noise codes received from satellites 7a, 7b and 7c, and calculates an estimated location $P_G$ of the receiver 7 (vehicle location).

The processing unit 8 integrates the distances detected by the distance sensor 4 and the amount of the heading changes detected by the heading sensor 3, and detects the location of the vehicle by comparing the integrated data with the map data that have been read out by the memory drive 6. The vehicle location is corrected with the aid of the data about the estimated location $P_G$ that has been obtained in the GPS receiver 7, and then the corrected vehicle location is outputted as a current location and heading of the vehicle.

Figure 2:
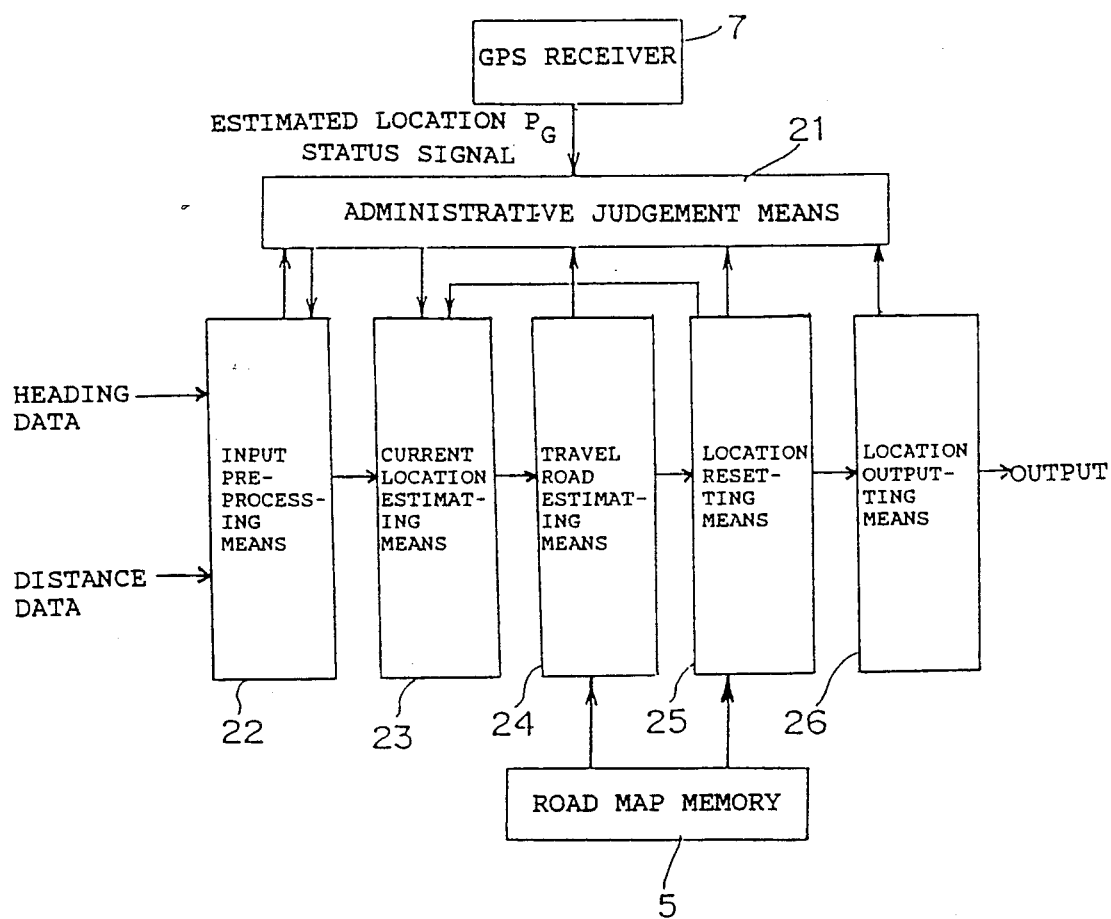
FIG. 2 is a block diagram showing the location detecting processes of the vehicle location detecting system.

FIG. 2 schematically illustrates the structure of the processing unit 8. In FIG. 2, input preprocessing means 22 receives the heading data sampled from the heading sensor 3 and distance data sampled from the distance sensor 4, and calculates an optimum estimated heading by calibration or filtering. Based on the optimum estimated heading obtained from the input preprocessing means 22 and distance data, current location estimating means 23 calculates an optimum estimated location by dead reckoning. In addition, the current location estimating means 23 receives a corrected current location obtained from a location resetting means 25 to update the optimum estimated location. Travel road estimating means 24 calculates repeatedly the degree of similarity between the road network data base obtained from the road map memory 5 and the optimum estimated location in order to obtain an optimum vehicle location $P_M$ of the vehicle on the road, and also calculates the probability area $\sigma_M$ of the optimum vehicle location.

Figure 3:
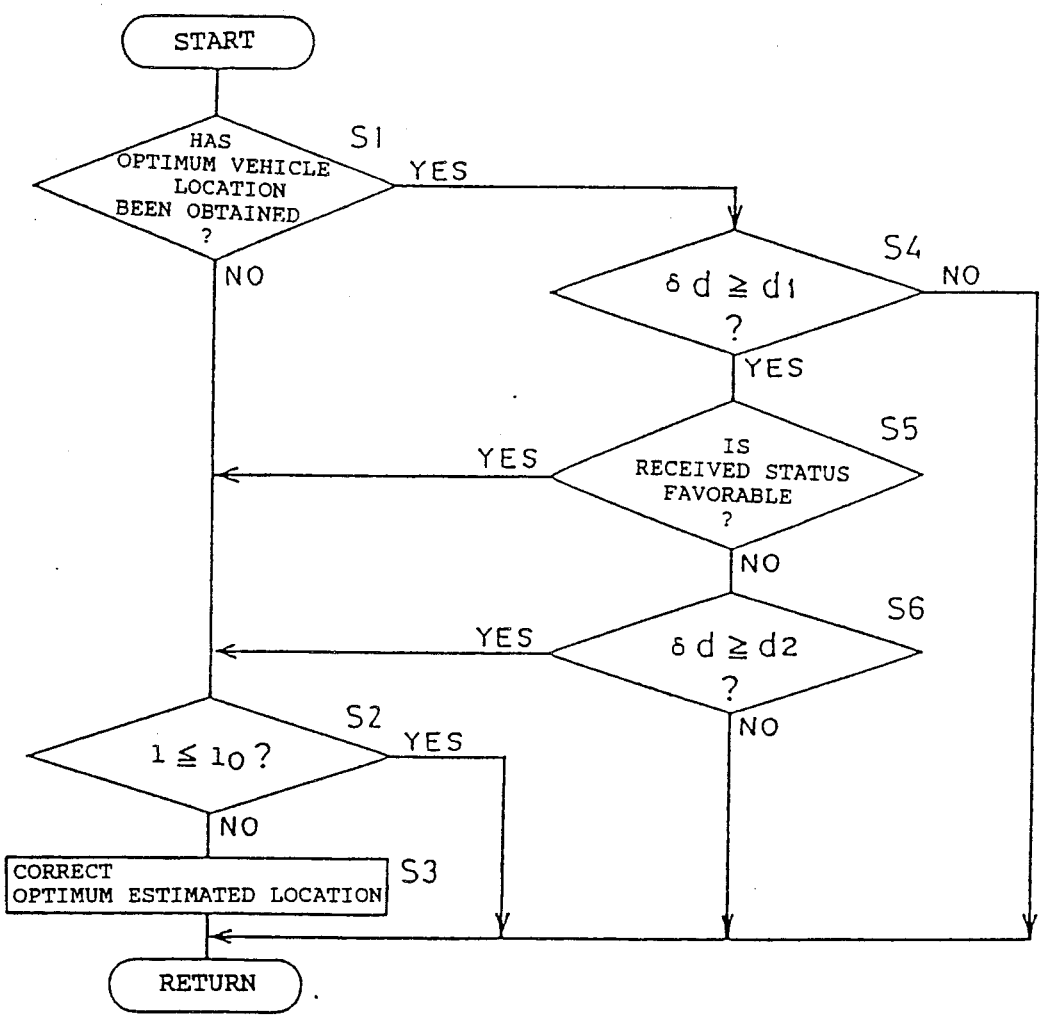
FIG. 3 is a flow diagram showing the main steps used for correcting an optimum estimated location or optimum vehicle location of a vehicle with the aid of an estimated location of the vehicle obtained from the GSP receiver of FIG. 1.

Based on the estimated location $P_G$ that has been obtained from the GPS receiver 7, and the probability area $\sigma$ of the estimated location $P_G$ which is obtained from the arrangement of the satellites 7a, 7b and 7c or status signal representing a received state of radio waves from the satellites, and also based on the optimum vehicle location $P_M$ that has been obtained by the travel road estimating means 24, degree of similarity, and probability area $\sigma_M$ of the optimum vehicle location $P_M$, administrative judgement means 21 corrects the optimum estimated location that has been obtained in the current location estimating means 23, by the algorithm shown in FIG. 3. A new optimum vehicle location that has been obtained from the corrected optimum estimated location is supplied to a location outputting means 26, which then supplies the new optimum vehicle location to the navigation controller 9.

The algorithm used for correcting the optimum estimated location or optimum vehicle location $P_M$ with the aid of the estimated location $P_G$ of the vehicle that has been obtained from the GPS receiver 7, will hereinafter be described with respect to FIG. 3.

Figure 4:
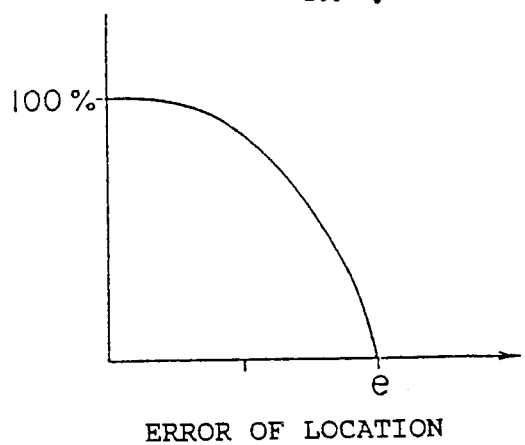
FIG. 4 is a diagram showing the relationship between the error of location of the optimum estimated location and the probability of road matching of the optimum estimated location.

The error of location between the optimum estimated location obtained from the current location estimating means 23 by dead reckoning and the actual location of the vehicle is first calculated. The degree of similarity between the above described optimum estimated location and the road network data is then calculated to obtain a probability of matching with an actual road road. Consequently, the relationship between the location error and the road matching probability (degree of similarity) is obtained as shown in FIG. 4. That is, if the location error is small, then the optimum vehicle location $P_M$ can be certainly obtained on a road, while the degree of similarity between the optimum estimated location and the road pattern is being calculated repeatedly during travel. In other words, the vehicle location can be specified on a specific road. If, on the other hand, the location error becomes larger and larger, the matching probability is greatly reduced even if the degree of similarity to the road pattern is calculated. If the location error (meter) becomes larger than the point e (meter) shown in FIG. 4, the map matching is no longer applicable even if the degree of similarity is calculated repeatedly. In that case, it becomes necessary that the optimum estimated location obtained from the current location estimating means 23 by dead reckoning is corrected by some methods, because the vehicle location cannot be specified on a specific road.

Therefore, in order to correct the optimum estimated location of the vehicle, the administrative judgement means 21 corrects the vehicle location with the aid of the estimated location $P_G$ that has been obtained from the GPS receiver 7 under a certain condition, and feeds the corrected location back to the current location estimating means 23.

First, in step 1 of FIG. 3, the travel road estimating means 24 repeatedly calculates, over a certain travel distance (for example, more than 2 Km), the degree of similarity between the road network data base obtained from the road map memory 5 and the optimum estimated location that has been obtained from the current location estimating means 23 by dead reckoning, and determines if an optimum vehicle location has been obtained with the aid of the calculated degree of similarity. If no, the step 1 advances to step 2.

In the step 2, it is determined if the vehicle has traveled over a predetermined distance lo after the previous vehicle location was corrected. If no, the step 2 advances to a "return" in order to avoid that the correction becomes complicated. If the vehicle has traveled over the predetermined distance lo, the step 2 advances to step 3, in which the optimum estimated location that has been obtained by dead reckoning is replaced with the estimated location $P_G$ obtained from the GPS receiver 7. That is, since the vehicle location cannot be obtained by the road matching, the estimated location $P_G$ obtained from the GPS receiver 7 is automatically employed as an optimum estimated location.

Next, if the optimum vehicle location has been obtained in the step 1, then the step 1 advances to step 4, in which a difference $\delta d$ between the estimated location $P_G$ obtained from the GPS receiver 7 and the optimum vehicle location $P_M$ obtained in the travel road estimating means 24 by the road matching (degree of similarity) is calculated, and it is determined if the difference $\delta d$ is above a first reference value d1 (for example, 50 m). If the difference $\delta d$ is below the first reference value d1, then the optimum vehicle location $P_M$ obtained by the road matching is considered to be more accurate (that is, the optimum vehicle location $P_M$ is not corrected and becomes a current location of the vehicle), and the step 4 advances to the "return". If the difference $\delta d$ is above the first predetermined value d1, the step 4 advances to step 5, in which the status signal obtained from the GSP receiver 7 is checked, and it is determined if the received status is favorable. The received status is intended to mean a ranking representing the detection accuracy of a received position (vehicle location) determined from the arrangement state of satellites or the detection accuracy of a received position (vehicle location) determined from the level or interrupted state of the received radio waves. The main reason that the received status is checked is that the accuracy of the estimated location $P_G$ changes depending upon the arrangement state of the satellites or that if the vehicle travels between high buildings, under elevated roads or under trees, the radio waves from the satellites are weakened and therefore the reliability of location information obtained is relatively reduced The location detection accuracy is reduced to about 100 m if the received state is deteriorated. If the received status is favorable, the error in the estimated location $P_G$ of the vehicle by the satellites is considered to be smaller than the error in the optimum vehicle location $P_M$ obtained by the map matching, and the step S5 advances to the step S2.

If the received status is not favorable, the step S5 advances to step S6, wherein it is determined if the above described difference $\delta d$ is above a second reference value d2 (for example, e meter shown in FIG. 4). The reason that the second reference value d2 is employed is based on the presupposition that even if the received status is not favorable, the estimated location $P_G$ obtained from the GPS receiver 7 will be smaller in error than the optimum estimated location having no possibility of matching with a road.

If the difference δd is below the second reference value d2, the step S6 advances to the "return" without employing the estimated location $P_G$ obtained from the GPS receiver 7, because the received status is not favorable. If the difference δd is above the second reference value d2, the step S6 advances to the step 2 to employ the estimated location $P_G$ obtained from the GPS system even if the received status is not favorable.

As will be understood from the foregoing description, when the optimum vehicle location $P_M$ cannot be calculated by the road matching process, the estimated location $P_G$ obtained from the satellites 7a, 7b and 7c is automatically employed That is, the optimum estimated location obtained by the current estimating means 23 is replaced with the estimated location $P_G$ obtained by the GSP receiver 7. When, on the other hand, the optimum vehicle location $P_M$ can be accurately calculated by the road matching process, the optimum vehicle location $P_M$ by the road matching process is automatically employed That is, the optimum vehicle location $P_M$ obtained by the road matching is outputted as a current location of the vehicle without being corrected. In addition, if the accuracy of the vehicle location calculated by the road matching process is not favorable, then either the estimated location $P_G$ or optimum vehicle location $P_M$ is employed taking account of the accuracy of the road matching and the received state from the satellites Therefore, by suitably selecting information about vehicle locations obtained by the road matching and GPS receiver 7, a most probable vehicle location at this time can be obtained This corrected vehicle location is fed back to the current location estimating means 23 to initialize the road matching process and thus minimize the location error. Consequently, the probability of the road matching is greatly increased.

The method of correcting the received location (vehicle location) in the step S3 of FIG. 3 will hereinafter be described.

It is simplest that the optimum estimated location is replaced using the estimated location $P_G$ obtained from the GPS receiver 7.

Figure 5:
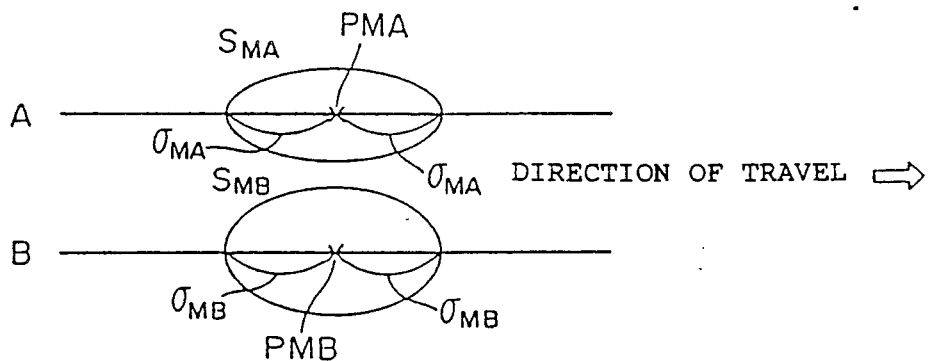
FIG. 5 is a diagram showing the degree of similarity and probability area of the optimum vehicle location obtained by the road matching.
Figure 6:
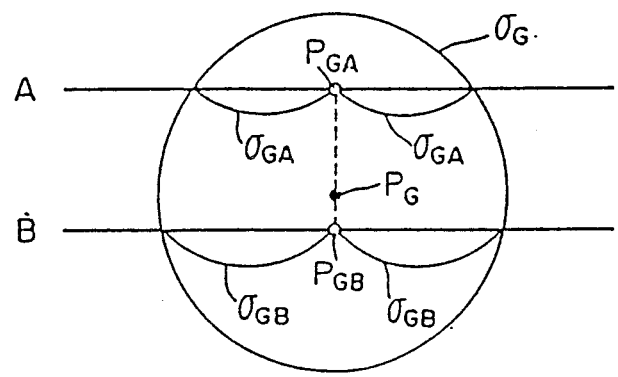
FIG. 6 is a diagram showing the probability area of the estimated location obtained by the GPS receiver.
Figure 7:
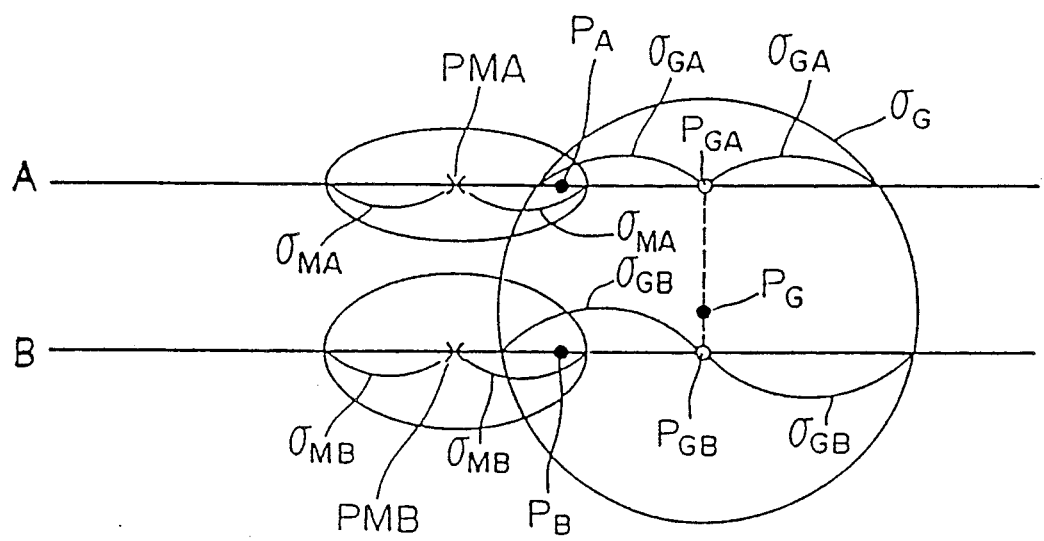
FIGS. 7 and 9 are diagrams showing the state in which the probability area obtained by the road matching and the probability area obtained by the GPS receiver are overlapped.

In addition to this, there is a method shown in FIGS. 5-7. Assume that two roads A and B are qualified as roads that are subjected to the road matching. At this time, degrees of similarity in the roads A and B are $S_{MA}$ and $S_{MB}$, respectively, and the probability areas in the roads A and B are $\sigma_{MA}$ and $\sigma_{MB}$, respectively.

If the vehicle location is determined by the road matching without using the estimated location $P_G$ obtained from the GPS receiver 7, then a vehicle location PMA or PMB located within a larger degree of similarity $S_{MA}$ or $S_{MB}$ becomes an optimum vehicle location.

On the other hand, assume that the estimated location $P_G$ obtained by the GPS receiver 7 and the probability area $\sigma_G$ of the estimated location $P_G$ are obtained as shown in FIG. 6. If the vehicle is moving on a road, it should be located on the road A or B. Therefore, an intersection $P_{GA}$ between the road A and a vertical line from the estimated location $P_{GA}$ to the road A is obtained as a vehicle location on a road, and the probability area in the road A becomes $\sigma_{GA}$, as shown in FIG. 6. Likewise, an intersection $P_{GB}$ between the road B and a vertical line from the estimated location $P_G$ to the road B is obtained as a vehicle location on a road, and the probability area in the road B becomes $\sigma_{GB}$.

When the probability areas $\sigma_{MA}$ and $\sigma_{MB}$ that have been obtained by the road matching and the probability areas $\sigma_{GA}$ and $\sigma_{GB}$ in roads A and B that have been obtained by the GPS receiver 7 are overlapped as shown in FIG. 7, the vehicle locations $P_A$ and $P_B$ on the roads A and B (position A is expressed by a complex number) can be calculated by the following equations (1) and (2):

$$P_A = \frac{1}{\sigma_{MA} + \sigma_{GA}}(\sigma_{GA}P_{MA} + \sigma_{MA}P_{GA}) \quad (1)$$

$$P_B = \frac{1}{\sigma_{MB} + \sigma_{GB}}(\sigma_{GB}P_{MB} + \sigma_{MB}P_{GB}) \quad (2)$$

In addition, errors $\sigma_A$ and $\sigma_B$ in that case can be calculated by the following equations (3) and (4):

$$\sigma_A^2 = \frac{\sigma_{MA}^2 \sigma_{GA}^2}{\sigma_{MA}^2 + \sigma_{GA}^2} \quad (3)$$

$$\sigma_B^2 = \frac{\sigma_{MB}^2 \sigma_{GB}^2}{\sigma_{MB}^2 + \sigma_{GB}^2} \quad (4)$$

For example, in the case of $S_{MA} < S_{MB}$ (degree of similarity), the vehicle location $P_B$ can be employed as an optimum estimated location and optimum vehicle location.

Figure 8:
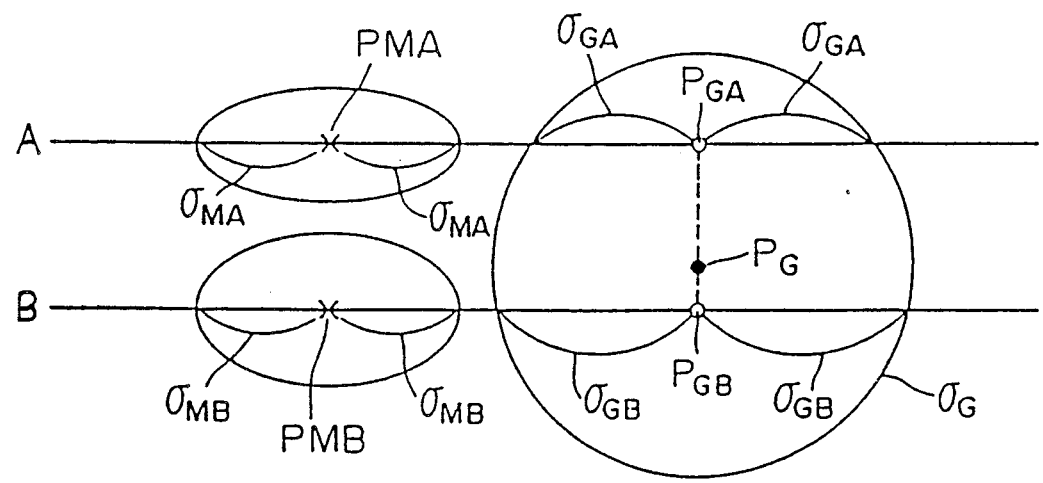
FIG. 8 is a diagram showing the state in which the probability area obtained by the road matching and the probability area obtained by the GPS receiver are not overlapped.
Figure 9:
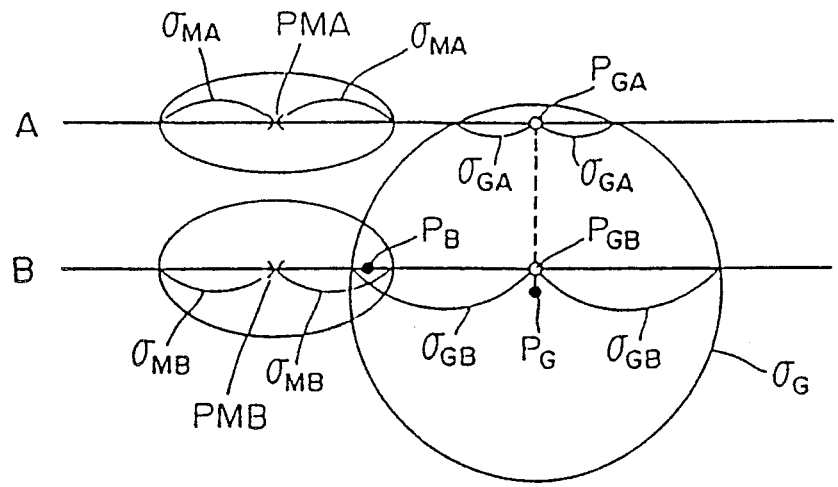

When the probability areas $\sigma_{MA}$ and $\sigma_{MB}$ that have been obtained by the road matching and the probability areas $\sigma_{GA}$ and $\sigma_{GB}$ in the roads A and B that have been obtained by the GPS receiver 7 are not overlapped as shown in FIG. 8, the optimum estimated location is merely replaced using the estimated location $P_G$ obtained by the GPS receiver 7. In addition, when the probability areas $\sigma_{MA}$ and $\sigma_{GA}$ are not overlapped and only the probability areas $\sigma_{MB}$ and $\sigma_{GB}$ are overlapped as shown in FIG. 9, the vehicle location $P_B$ can be obtained by the above described equations (2) and (4).

Figure 10:
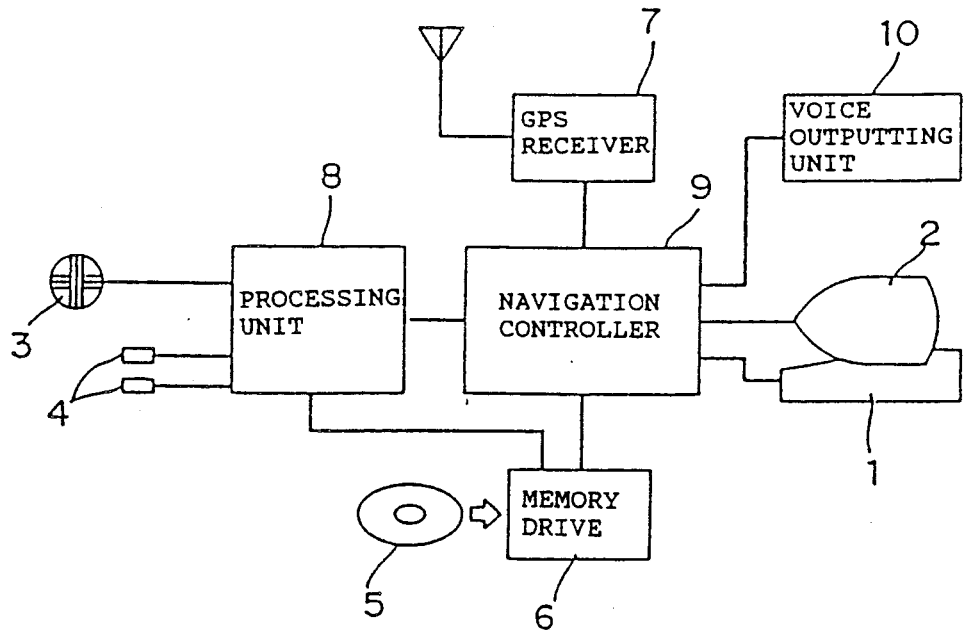
FIG. 10 is a block diagram showing the structure of a vehicle location detecting system according to another embodiment of the present invention.

The present invention will not be limited to the above described embodiment For example, as shown in FIG. 10, the GPS receiver 7 may be connected to the navigation controller 9. In that case, a position signal from the GPS receiver 7 is supplied through the navigation controller 9 to the processing unit 8. In addition, the estimated location of the vehicle can be obtained by a geostationary satellite system. The estimated location may also be obtained by signposts that typically are, for example, low power radio transmitters located on streets to sense and transmit information identifying the location of a passing vehicle.

The invention has been described with reference to the preferred embodiment. Obviously modifications and alternations will occur to others upon a reading and understanding of this application. It is intended to include all such modifications and alternations insofar as they come within the scope of the appended claims or the equivalents thereof.

What we claim is:

1. A vehicle location detecting system comprising:

a heading sensor for detecting changes in the heading of a vehicle as it moves over streets;

a distance sensor for detecting distances traveled by said vehicle;

a road map memory for storing a map data base;

location detecting means for detecting a first estimated location of said vehicle; and correction arithmetic means for calculating a second estimated location of said vehicle from said distances detected by said distance sensor and said changes in said heading detected by heading sensor, for detecting an optimum vehicle location of said vehicle by calculating a degree of similarity between said second estimated location and said map base obtained from road map memory, for calculating a probability area of said first estimated location including an actual location of said vehicle and a probability area of said optimum vehicle location including an actual location of said vehicle, and for correcting said second estimated location with the aid of said first estimated location in accordance with said degree of similarity, said probability area of said first estimated location and said probability area of said optimum vehicle location.

2. A vehicle location detecting system as set forth in claim 1, wherein said correction arithmetic means corrects said second estimated location with the aid of said first estimated location, when said optimum vehicle location has not been obtained by calculating said degree of similarity.

3. A vehicle location detecting system as set forth in claim 1, wherein, even when said optimum vehicle location has been obtained by calculating said degree of similarity, said correction arithmetic means corrects said second estimated location with the aid of said first estimated location, if a distance difference between said optimum vehicle location and said first estimated location is above a reference value.

4. A vehicle location detecting system as set forth in claim 3, wherein said reference value is determined in accordance with a size of said probability area of said first estimated location.

5. A vehicle location detecting system as set forth in claim 1, wherein, when said probability area of said first estimated location and said probability area of said optimum vehicle location are overlapped, said correction arithmetic means corrects said second estimated location to the overlapped part.

6. A vehicle location detecting system as set forth in claim 1, wherein said location detecting means comprises a global positioning system wherein the location of a vehicle is detected using a plurality of satellites.

* * * * *